(No Model.) 4 Sheets—Sheet 1.

C. B. WITHINGTON.
GRAIN BINDER.

No. 378,226. Patented Feb. 21, 1888.

WITNESSES
Wm A. Skinkle
Geo. W. Young

INVENTOR
Charles B. Withington.

By his Attorneys
Ramainson & Ramainson (No Model.) 4 Sheets—Sheet 2.
C. B. WITHINGTON.
GRAIN BINDER.

No. 378,226. Patented Feb. 21, 1888.

WITNESSES
Wm A. Skinkle
Geo. W. Young

INVENTOR
Charles B. Withington
By his Attorneys
Parkinson & Parkinson (No Model.) 4 Sheets—Sheet 4.
C. B. WITHINGTON.
GRAIN BINDER.
No. 378,226. Patented Feb. 21, 1888.
Fig. 8.
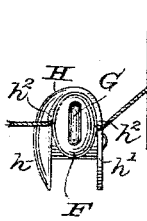
Fig. 12.
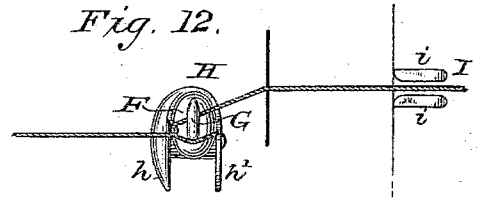
Fig. 9.
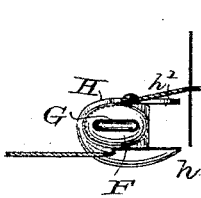
Fig. 13.
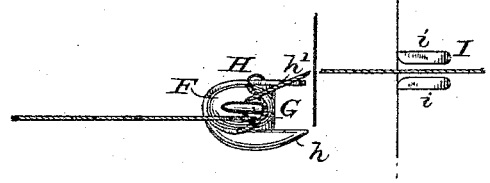
Fig. 10.
Fig. 14.
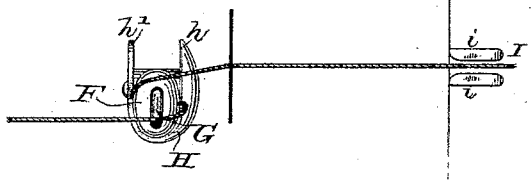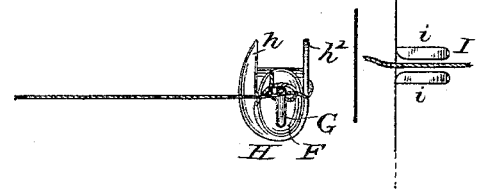
Fig. 11.
Fig. 15.
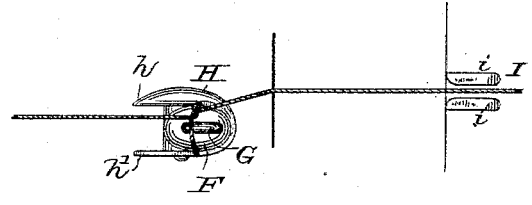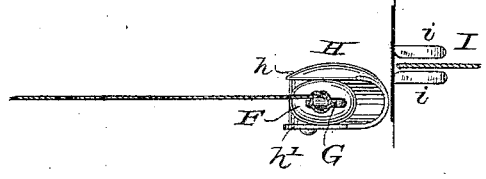
WITNESSES
Wm A. Skinkle
Geo. W. Young.
INVENTOR
Charles B. Withington
By his Attorneys
Parkinson & Parkinson

UNITED STATES PATENT OFFICE.

CHARLES B. WITHINGTON, OF JANESVILLE, WISCONSIN.

GRAIN-BINDER.

SPECIFICATION forming part of Letters Patent No. 378,226, dated February 21, 1888.

Application filed March 7, 1885. Serial No. 158,069. (No model.)

*To all whom it may concern:*

Be it known that I, CHARLES B. WITHINGTON, a citizen of the United States, residing at Janesville, in the county of Rock and State of Wisconsin, have invented certain new and useful Improvements in Grain-Binders, of which the following is a specification.

In binding grain by automatic mechanism it has long since been found necessary to furnish slack between the knotter and holder on account of the rotary or winding movement of the knotter drawing upon the cord between itself and the holder in forming the knot, since under these conditions, if no slack is given, the cord will either be pulled from the holder or will break. Various devices have heretofore been adopted to accomplish this object, among them the mounting of the knotter in such manner that it is drawn toward the holder by the stress of the cord as it winds the latter in forming the knot; but this imposes too much strain upon the cord and endangers its being drawn from the holder by any jar or accidental backlash of the machine.

My present invention has for its object, primarily, to remove the last-named objection; and it consists, mainly, in so mounting and actuating the knotter that in its effective action it shall move positively toward the cord-holder, turning upon its pivot and winding the cord about itself concurrently with said movement, so that the cord-holder may be stationary at all times.

It consists, also, in various other improvements, combinations, and details of construction, hereinafter described and claimed.

Figure 1:
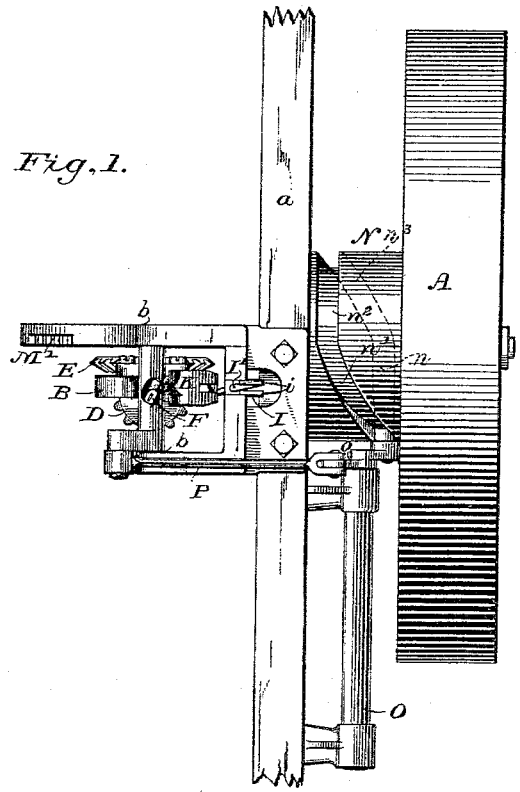
Figure 2:
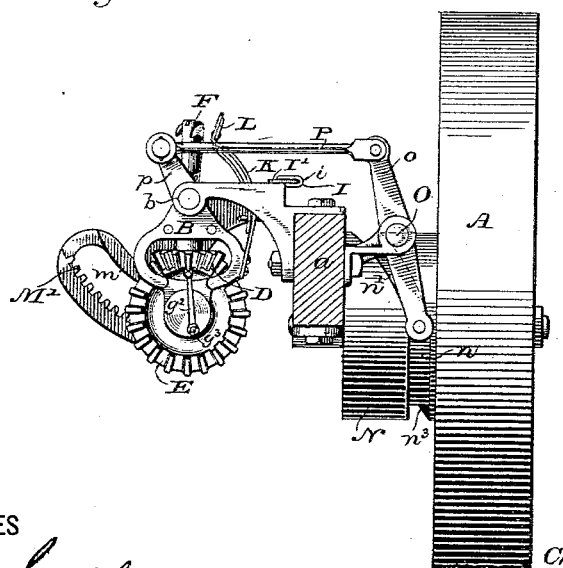
Figure 3:
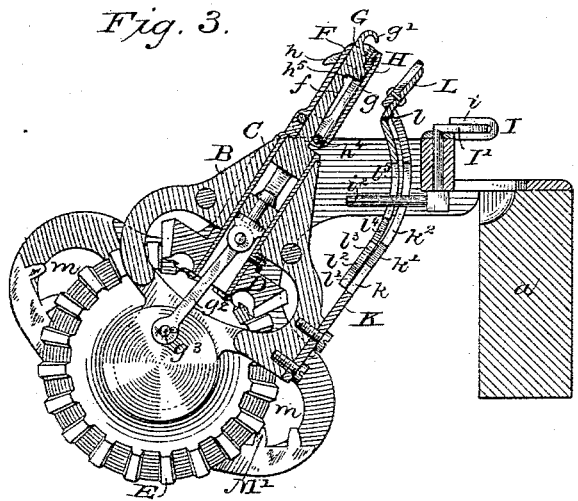
Figure 4:
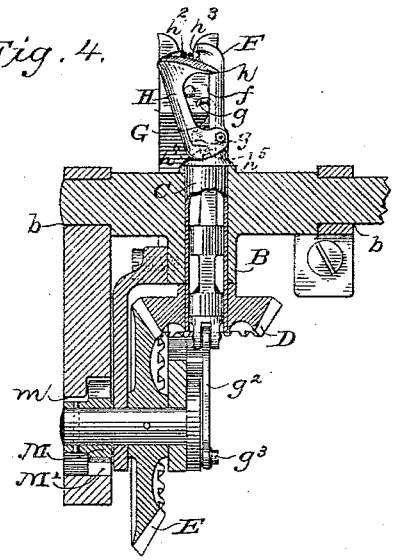
Figure 5:
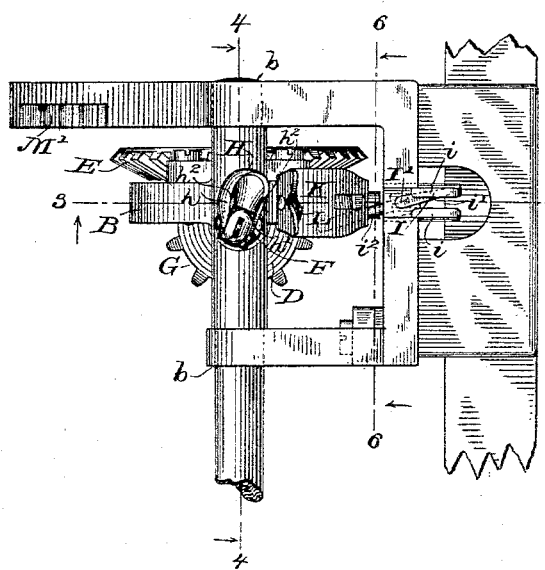
Figure 6:
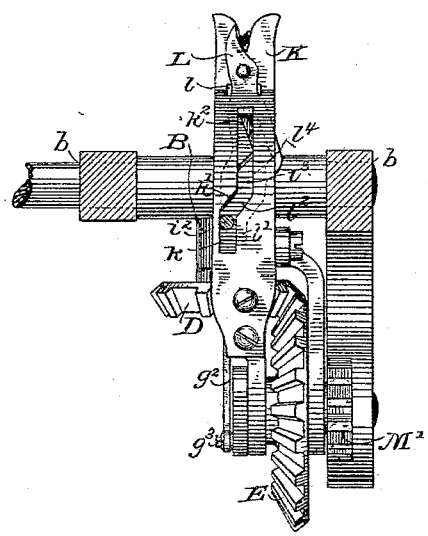
Figure 7:
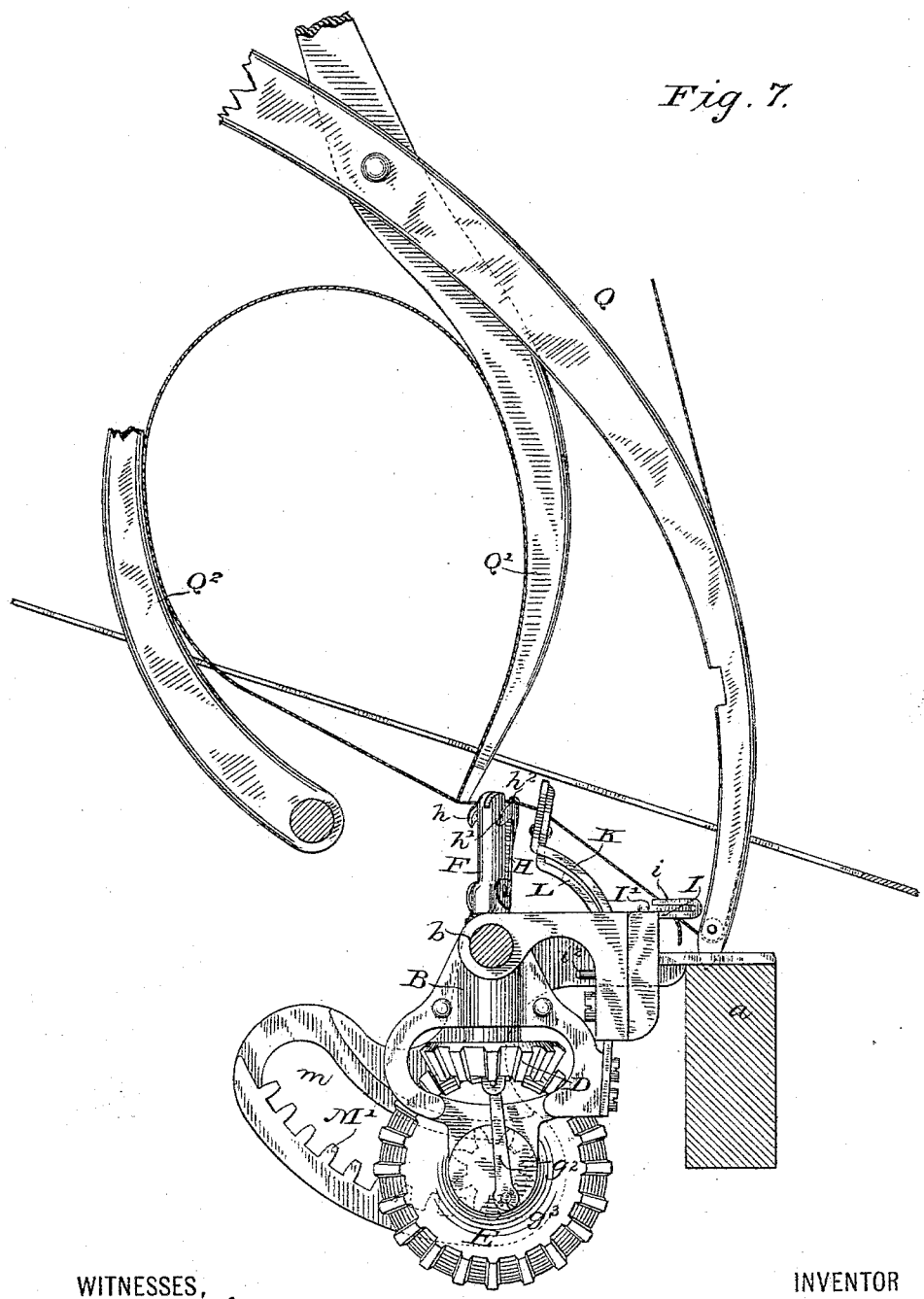

In the drawings, Figure 1 is a top plan view of so much of a grain-binder embodying my invention as is necessary to an understanding thereof. Fig. 2 is an elevation from the front; Fig. 3, an enlarged detail in vertical section of the knotting, holding, and cutting apparatus and their immediate actuating mechanism; Fig. 4, a like enlarged detail in vertical section at right angles to the former of the same mechanism; Fig. 5, a top plan view of the knotter, holder, and cutter, and their actuating mechanism and a portion of the supporting-frame; Fig. 6, a detail of the cord-cutter and its actuating mechanism; Fig. 7, a side elevation of the knotter, cutter, and holder, and their actuating mechanism with the binder-arm, compressor, and cord-tucker partly broken away. Figs. 8 to 15 illustrate the action of the knotter and cutter in the successive stages of their operation.

A represents the main or carrying wheel of a harvester, and $a$ $a'$ the lateral bars of the wheel-frame, one of which I have selected, for the purpose of explaining my invention, as a seat for the frame or bracket which supports the knotting, holding, and cutting devices. These may be of any usual and approved construction, so far as relates to the leading feature of my improvement; but I shall describe herein mechanism of my own invention, constituting additional features of said improvement, which I at present deem the most suitable for the purpose.

In bearings $b$ in the just-mentioned bracket or frame is pivoted a stock or head, B, which is bored transversely to its axis for the passage of a tubular shaft, C, having at its lower end a bevel-pinion, D, which meshes with and is driven by a bevel-gear, E, on the end of a short shaft or axle, $e$, mounted in a bearing at the foot of the stock. The upper part of the tubular shaft is prolonged beyond the top of the stock to form a knotting-tube, F, which, however, is cut away along one side, as at $f$, to near its extreme end, to permit the play of a lug or shoulder, $g$, upon the spindle of the cord-hook G, which reciprocates to and fro in the tube, and at the proper time is so far projected that its hook $g'$ extends beyond the end of the tube to catch the crossed ends of the cord. This reciprocating motion is imparted by means of a pitman, $g^2$, connected with a wrist-pin, $g^3$, on a disk at the end of the short shaft to which the bevel-gear is keyed, and directly beneath the tubular shaft, so that as the gear revolves it turns the knotting-tube and the pitman synchronously operates the cord-hook.

To the shaft of the knotting-tube is pivoted a saddle-piece, H, provided with curved arms $h$ $h'$, which embrace the tube near its effective end to bar the entrance of the cord between the saddle-piece and body of the tube, and have shoulders $h^2$, between which and the side of the tube the two strands of cord will be clamped and held against pulling through preparatory to and during the knotting action. The arm h is also of such outline as to act as a deflector for the strands in forming the knot. To more effectually prevent the escape of the strands when thus clamped, a groove, $h^3$, is formed partially about the periphery of the tube at this point in opposition to the shoulders. In the shank of the saddle-piece, near its pivot, but on the side farthest from the shoulder end, is a transverse pin, $h^4$, placed in such relation to the shank of the cord-hook that whenever this is at all projected from its lowest position it will act upon the pin to force the saddle-piece shut and clamp the cord previously laid between its shoulders and the knotting-tube, and to hold it clamped during the subsequent knotting action and the projecting and withdrawing movement of the hook, so that when the hook is withdrawn to its lowest limit the lug upon its shank will strike the pin and a notch, $h^5$, in said shank, just inside of the lug, will permit the pin to move in, so that the saddle-piece may be positively opened to release the cord to permit the completed knot to be pulled from the knotter and the knot tightened.

The holder I is located substantially in the plane of oscillation of the knotter, so that said knotter may swing toward and from it, and is composed of two cheeks, $i$, with an opening, I′, between them, in which the cord is laid by the binding-arm, and across which the pivoted holder-jaw I′ plays into recesses or horizontal slots in said cheeks, to bend and clamp the binding-cord alternately against and into one cheek and then the other. An arm or pin, $i^2$, projects from the pivot of this holder-jaw, by which it is operated in the oscillation of the knotter, as will be directly explained.

From the lower part of the knotter-head rises an arm or bracket, K, curved for a portion of its length in an arc practically concentric with the axis on which the head swings, but generally trending parallel with the knotter-tube, and having in this curved part a cam-slot which at its lower end has a short reach, $k$, straight or parallel with the plane of oscillation of the knotter-head, and corresponding with the initial movement of the knotter toward the holder, then has a deflection, $k'$, and then again becomes straight for a reach, $k^2$, longer than the first straight reach, and corresponding with the continued motion of the knotter toward the holder after the cord has been severed. In this slot the pin from the holder-jaw is received, and therefore as the knotter-head oscillates this pin will be operated, first being held stationary by the short reach, then pushed to one side by the deflection, forcing the holder-jaw into one of the slotted cheeks, and then again held stationary for a longer period by the longest straight reach and until the termination of the movement of the knotter toward the holder.

At its extreme outer end, between the knotter and the holder, the arm K becomes straight, and is slotted to receive the cord and to afford a cutting-edge, and, also, in the intervals between the severing of the cord, to serve as a guide or rest adjacent to the end of the knotter, in which the strands of cord are laid and retained in proper position for the action of the knotter. To and beneath the straight or plane portion is pivoted a knife, L, which works in connection with said cutting-edge to sever the cord, and which at its heel passes through a slot, $l$, in the "arm" or "cutter-bracket," as it may hereafter be called, and is then bent or curved in an extended shank lying parallel with the inner face of said bracket. A cam-slot is formed in said shank, having five reaches, of which the first or lowest, $l'$, corresponds to the first reach of the cam-slot in the bracket, the second, $l^2$, to the deflection therein, and the third, $l^3$, with the initial part of the longer reach in the bracket, while the fourth, $l^4$, deflects sharply at that point from the long reach, in order to be acted upon by the pin from the holder-jaw, which passes through the slot in the shank of the cutter as well as the slot in the bracket, and which, being held stationary by the straight reaches in the arm, forces the cutter by its action upon this deflection in such a direction as to sever the cord. This movement brings the fifth or final reach, $l^5$, in line with the long reach in the bracket, that the pin entering therein may hold the cutter stationary after its severing movement until the oscillation of the knotter is finished and it is in its initial return oscillation. In this return movement the cutter, after leaving the fifth, will be opened by its fourth reach, but held stationary by the matching of the other three with the outline of the cam-slot in the arm or bracket.

Upon the short shaft which carries the bevel-gear is a pinion, M, which meshes with and is turned by an internal segment-rack, M′, at the foot of the bracket or frame in which the knotter-head oscillates, and is kept from running out of mesh with said rack by its hub or by the projecting end of its shaft entering a slot or guideway, $m$, at the side of the rack. By means of this rack and pinion motion is imparted through the bevel-gear and the bevel-pinion at the end of the knotter-shaft, with which it meshes, to the knotter tube, and by means of the wrist-pin and link to the knotter-hook, while the knotter and cutter are mutually operated, as explained, in the oscillatory movement of the stock, by the pin from the holder-jaw and the cam-slot in the cutter-bracket, with which said pin engages.

Any suitable means may be employed to positively impart the oscillatory movement at suitable intervals, depending upon whether the binder is set in motion by a trip automatically actuated by the accumulation of the grain, or whether there is a binding operation to every determined number of revolutions of the main wheel. It will be sufficient, however, for a proper understanding of the invention to explain the single means shown.

Upon the axle of the main wheel is mounted loosely a drum, N, ratchet-clutched to the hub of said wheel, so as to be operated in the advancing movement only. In the periphery of this drum is formed a cam-slot, having first a straight reach, $n$, at one side of the drum, which represents the period during which the knotter is in position to receive the cord and lying close to the gavel, next a deflection, $n'$, extending to the other side of the drum and representing the movement of the knotter toward the holder; third, another straight reach, $n^2$, which corresponds with the temporary rest of the knotter adjacent to the holder while the completed knot is being pulled from the cord-hook by the discharge of the gavel; and, finally, a return deflection, $n^3$, extending to the commencement of the first straight reach, serving to restore the knotter to its initial position for the reception of the cord.

A rock-shaft, O, mounted in bearings on the frame has a depending crank-arm with a roller at its end extending into the cam-slot in the drum, and a second crank-arm, $o$, rising vertically or nearly vertically and connected by a link, P, with an arm or lever, $p$, rising from the knotter-head above its pivotal connection with the bracket-frame. Thus as the drum is revolved by the main wheel the rock-shaft will be oscillated and the knotter-head swung and held at rest in its bearings in the order just stated.

The cord is brought to the knotter and holder by any suitable binding-arm—as, for instance, the binding-arm Q, used on the well-known "Withington machines," manufactured by the McCormick Harvesting Machine Company—and may be pressed over the knotter and forced between the knotting-tube and the shoulders of the saddle-piece, as indicated in Fig. 7, by the cord-tucker Q', employed in connection with such arm, while the gavel may, in case the machine is not automatically tripped by the accumulation of the grain packed against a tripping instrumentality, be compressed by an arm, $Q^2$, such as usual in said machines. Suppose, now, one end of the cord to be secured in the holder and stretched through the slot in the cutter-bracket and over the end of the knotter (then at its extreme distance from the holder) between the side of the knotter-tube and the shoulders on the saddle-piece and a gavel to be collected, the binder-arm descends, bringing the second strand of the cord alongside the first and into the space between the cheeks of the holder, the tucker at the same time moving to press said strand down close to the first between the gavel and the knotter, and thereby lay it in the space between the tube and the shoulders on the saddle-piece. The first or initial movement of the head causes the knotter-hook to start upward from its extreme lowest position in which it had been resting and holding the saddle-piece open. This upward movement instantly closes the saddle-piece, clamping the cord against the knotting-tube. The knotter is now at the relative distance from the holder indicated by Fig. 8 on the last sheet of drawings, and its successive positions in the knotting operation, as well as its relative distances from said holder in such positions, are indicated by the ensuing diagrams on said sheet. As soon as the cord has been clamped, the strands between the knotter and the gavel are struck and deflected by the arm $h$ of the saddle-piece, so that when the knotter has completed a quarter-turn and is at the relative distance from the holder indicated in Fig. 9 the cord has assumed the position there represented. As the knotter continues to revolve, the strands leading to the holder are deflected by said arm, bringing them at the half-turn into the position represented in the next figure. At the completion of the full turn the strands leading, respectively, to the holder and to the gavel have slipped over the tube of the knotter and are crossed upon each other. The next quarter-turn brings the strands leading to the holder beneath the cord-hook, which is now fully projected, and at the end of a turn and a half these strands have been withdrawn into the tube by the recession of the hook, and the cutter has just acted to sever them. The knotter is now very near to the holder, as indicated in Fig. 13, and has but to complete the full second turn to cause the action of the cord-hook upon the saddle-piece to release the hold upon the cord clamped between said saddle-piece and the knotter-tube, when the completed knot will be pulled from the hook now in its lowest retracted position. The cord, meanwhile, carried down by the binder-arm, has been gripped between the holder-jaw and one of the cheeks, and the holder-jaw in this action has passed entirely or nearly so within said cheek, leaving the space between the cheeks free. When the binding operation is terminated, the binder-arm rises, laying the cord running through its eye and now held by one side of the holder-jaw upon the other side of the jaw, which will almost immediately be swung back into the opposite cheek by the retrograde motion of the knotter-head and the consequent reversal of all the previous movements, and will clamp the cord in said cheek before it is released from the first. The binder-arm in its next descent will bring the cord down on the same side of the holder-jaw as in its first descent, and after it is severed it will first be gripped in one cheek and then clamped in the other, as before.

Having thus described my invention, what I claim, and desire to secure by Letters Patent, is—

1. The combination, substantially as hereinbefore set forth, of a knotter mounted in an oscillating head, a cord-holder located in the plane of oscillation of said knotter, so that the knotter may move toward the holder in the tying operation, and means whereby the oscillating head is positively swung on its axis to move the knotter toward the holder.

2. The combination, substantially as hereinbefore set forth, of a knotter mounted in an oscillating head, a cord-holder located in the plane of oscillation of said knotter, a lever-arm from the head, and a pitman connected with said lever-arm to swing the head in its bearings.

3. The combination, substantially as hereinbefore set forth, of a knotter mounted in an oscillating head, a bevel-pinion on the knotter-shaft, an intermeshing bevel-gear on a short shaft mounted in said head, a pinion on said short shaft, and a segment-rack, with which said pinion engages, whereby the knotter is rotated as the head is oscillated.

4. The combination, substantially as hereinbefore set forth, of a knotter mounted in an oscillating head, a cord-holder, toward which the knotter is swung in the tying operation, and a cord-cutter mounted upon said oscillating head to accompany the knotter in its movements.

5. The combination, substantially as hereinbefore set forth, of a knotter mounted in an oscillating head, a cord-holder, toward which the kotter is swung in the tying operation, and a cord-guide mounted upon the oscillating head between said knotter and holder and accompanying the knotter in its movements toward and from the holder.

6. The combination, substantially as hereinbefore set forth, of a knotter mounted in an oscillating head, a cord-holder consisting of two slotted cheeks and a pivoted jaw, toward which the knotter is swung in the tying operation, a cord-cutter consisting of a pivoted blade and a curved arm or bracket from the oscillating head, to which bracket said blade is pivoted, and a pin from the pivot of the holder-jaw entering a cam-slot in said bracket and projecting through a second cam-slot in the shank of the cutter-blade, whereby the holder and cutter are actuated as the knotter is swung toward and from the holder.

7. The combination, substantially as hereinbefore set forth, to form a cord-knotter, of a rotating knotting-tube, a cord-hook reciprocating therein, a saddle-piece pivoted to said knotting-tube and provided with curved embracing-arms for the tube and with clamping-shoulders which bind the cord thereagainst to prevent it from being pulled through prior to and during the knotting operation, and means whereby the saddle-piece is opened away from and closed against the tube to receive and clamp the cord.

8. The combination, substantially as hereinbefore set forth, in a cord-knotter, of the rotating knotting-tube, the cord-hook reciprocating therein, the saddle-piece pivoted to said tube and having curved embracing-arms and clamping-shoulders, which latter serve to bind the cord-strands against the tube to prevent them from being pulled through during the knotting operation, the peripheral groove in the knotting-tube opposed to said shoulders, and means whereby the saddle-piece is opened from and closed against the tube to receive and clamp the cord.

9. The combination, substantially as hereinbefore set forth, in a cord-knotter, of the rotating knotter-tube, the cord-hook reciprocating therein, the lug upon the cord-hook playing through a slotted side of the tube, the saddle-piece pivoted to the tube and having curved arms and clamping-shoulders, which latter serve to bind the cord-strands against the tube to prevent them from being pulled through during the knotting operation, and the pin arranged near the pivot of said saddle-piece, with which the lug upon the cord-hook engages to open it, and with which the shank of the hook engages to force it shut.

10. The combination, substantially as hereinbefore set forth, of the oscillating stock, the knotter mounted therein, the rock-shaft having an arm connected by a link with an arm from the stock, and the cam-slotted drum upon a constantly-driven shaft, with which another arm from said rock-shaft engages to oscillate the stock and knotter.

11. The combination, substantially as hereinbefore set forth, of the cutter-bracket having a cam-slot composed of two straight reaches and an intermediate deflection, the pivoted cutter-blade having a shank with a cam-slot extending along the other and composed of an initial straight reach, a deflection, and then a short straight reach corresponding to the first reach and deflection and part of the second reach of the first-named slot and another deflection and farther reach, and a pin playing along said cam-slots to operate the cutter-blade.

CHAS. B. WITHINGTON.

Witnesses:
WILLARD S. HYDE,
JOHN V. A. HASBROOK.